(12) United States Patent
Eubank et al.

(10) Patent No.: US 8,103,693 B1
(45) Date of Patent: Jan. 24, 2012

(54) SYSTEMS AND METHODS FOR SHARING DATA FROM WEB ACCESSED CALCULATORS

(75) Inventors: Mason Eubank, Boston, MA (US);
Nikolay Eshkenazi, San Antonio, TX (US); Neff Karl Hudson, San Antonio, TX (US); Michael Wayne Lester, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 13/029,917

(22) Filed: Feb. 17, 2011

Related U.S. Application Data

(63) Continuation of application No. 12/748,183, filed on Mar. 26, 2010, now Pat. No. 7,917,530, which is a continuation of application No. 11/486,876, filed on Jul. 13, 2006, now Pat. No. 7,716,156.

(51) Int. Cl.
*G06F 17/30* (2006.01)

(52) U.S. Cl. .......................... 707/776; 705/35; 715/226

(58) Field of Classification Search .................. 707/776
See application file for complete search history.

(56) References Cited

U.S. PATENT DOCUMENTS

| | | | | |
|---|---|---|---|---|
| 5,764,699 | A * | 6/1998 | Needham et al. | 375/261 |
| 5,999,971 | A * | 12/1999 | Buckland | 709/218 |
| 6,631,402 | B1 * | 10/2003 | Devine et al. | 709/217 |
| 6,651,217 | B1 * | 11/2003 | Kennedy et al. | 715/224 |
| 7,340,411 | B2 * | 3/2008 | Cook | 705/7.13 |
| 2002/0023108 | A1 * | 2/2002 | Daswani et al. | 707/507 |
| 2002/0046053 | A1 * | 4/2002 | Hare et al. | 705/1 |
| 2002/0065849 | A1 * | 5/2002 | Ferguson et al. | 707/513 |
| 2002/0073005 | A1 * | 6/2002 | Welnicki et al. | 705/35 |
| 2003/0061131 | A1 * | 3/2003 | Parkan, Jr. | 705/30 |
| 2003/0188262 | A1 * | 10/2003 | Maxwell et al. | 715/507 |
| 2004/0030697 | A1 * | 2/2004 | Cochran et al. | 707/9 |
| 2006/0242040 | A1 * | 10/2006 | Rader | 705/35 |

* cited by examiner

*Primary Examiner* — James Trujillo
*Assistant Examiner* — William Spieler
(74) *Attorney, Agent, or Firm* — Kilpatrick Townsend & Stockton LLP

(57) ABSTRACT

Various embodiments disclosed herein are directed to managing and sharing data between web accessed calculators. The systems include a data store to persist calculator inputs and outputs and share them with other calculators and with customer service representatives.

21 Claims, 8 Drawing Sheets

SYSTEMS AND METHODS FOR SHARING DATA FROM WEB ACCESSED CALCULATORS

CROSS REFERENCE TO RELATED APPLICATIONS

This application is a continuation of, and claims priority under 35 U.S.C. §120 to, pending U.S. application Ser. No. 12/748,183, filed on Mar. 26, 2010, and entitled, "Systems and Methods for Sharing Data from Web Accessed Calculators," which in turn claims priority under 35 U.S.C. §120 to U.S. application Ser. No. 11/486,876, filed on Jul. 13, 2006, and entitled, "Systems and Methods for Sharing Data from Web Accessed Calculators," (issued as U.S. Pat. No. 7,716, 156). This application is also related by subject matter to U.S. patent application Ser. No. 11/487,037, filed on Jul. 13, 2006, and entitled "Systems and Methods for Sharing Data from Web Accessed Calculators." The disclosure of each aforementioned application is incorporated by reference herein in its entirety.

TECHNICAL FIELD

This application relates generally to business to consumer electronic commerce web sites, and in particular to systems and methods for capturing and sharing data from and between calculators provided consumers in a web page.

BACKGROUND

Electronic commerce is a term that is commonly used to describe the distribution, purchase, sale, marketing, and servicing of goods or services over electronic networks such as the Internet. One critical requirement for the success of an electronic commerce web site is that they must provide value to the customer, as well as providing service and performance.

One way that businesses provide value to customers in a web site is to provide them with tools that the customer can use in solving a particular problem associated with the goods or services provided through a web site. Among the many tools provided are calculators that assist the customer in making a purchasing decision. For example, in a web site for a business that sells home-improvement products, such as flooring, appliances etc. the web site may provide calculators in a web page that make it easy for customers to size their needs. If the customer is interested in flooring, the retailer may provide a carpet calculator where the customer can input a room width and length, select a width of the carpet, and the calculator will determine the number of square yards that the customer requires. Similarly, if the customer is interested in an air-conditioning unit a calculator may be provided where the customer can input the room width, length, and height, and the calculator will determine the cooling capacity (in BTUs) required.

One industry that is very active in the electronic commerce area is the Financial Services industry. Financial services refers to services provided by organizations that deal with the management of money. Among the types of businesses involved in financial services are banks, investment banks, insurance companies, credit card companies and stock brokerages, which provide a variety of money and investment related services.

Web sites operated by financial services companies offer a wide variety of calculators for their customers. For example, loan calculators with amortization schedules may be provided by some companies. These calculators may vary with regard to their inputs, but many will have windows to input a principal amount, the number of months within which to pay the loan, an interest rate, the payment schedule, and a total amount paid for life of the loan. Among other common calculators are savings and investment calculators, retirement calculators, 401(k) calculators, etc. More complex calculators may be used to develop financial plans that take into account the assets, liabilities, debts, and expenses of an individual.

A disadvantage shared by sites that provide web pages with calculators is that data entered by the customer is not saved for future use by the customer and the business. Another disadvantage of the way calculators have been implemented in many sites is that data entered into one calculator cannot be shared with another calculator that may use the same data. Consequently, as customers use multiple tools and calculators, the same questions are asked multiple times. Furthermore, calculator inputs are not fed to a customer service representative's system so that they can analyze customers needs.

SUMMARY

Methods, computer-readable media and systems are provided for collecting, managing and sharing data generated by a user in a calculator included in a web page. In one such method, the data is shared among a plurality of calculators by creating a relational database that is used to save and search for data values generated by a user through the use of any calculator.

In another method, the data is collected shared and stored for a limited period of time.

There is also provided a methodology for managing data generated by a user in a calculator included in the web page including the sharing of data among calculators and the ability to mine the data for marketing purposes.

The systems and methods disclosed reduce the amount of customer time required to complete calculations from multiple calculators. Additionally, the systems and methods disclosed will facilitate customer switching between channels and reduce the amount of customer service representative time required to assess the needs of a customer.

These and other features described in the present disclosure will become more fully apparent from the following description and obtained by means of the instruments and combinations particularly pointed out in the appended claims, or may be learned by the practice of the systems and methods set forth herein. This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following detailed description, are better understood when read in conjunction with the appended drawings. For the purpose of illustrating the claimed subject matter, there is shown in the drawings example constructions of various embodiments; however, the systems and methods are not limited to the specific methods and instrumentalities illustrated in the drawings. In the drawings:

FIG. 4 illustrates the display of a loan calculator on a user's web browser;

FIG. 5 illustrates the display of a life insurance needs calculator on a user's web browser;

DETAILED DESCRIPTION

Example Computing Devices

Figure 1:
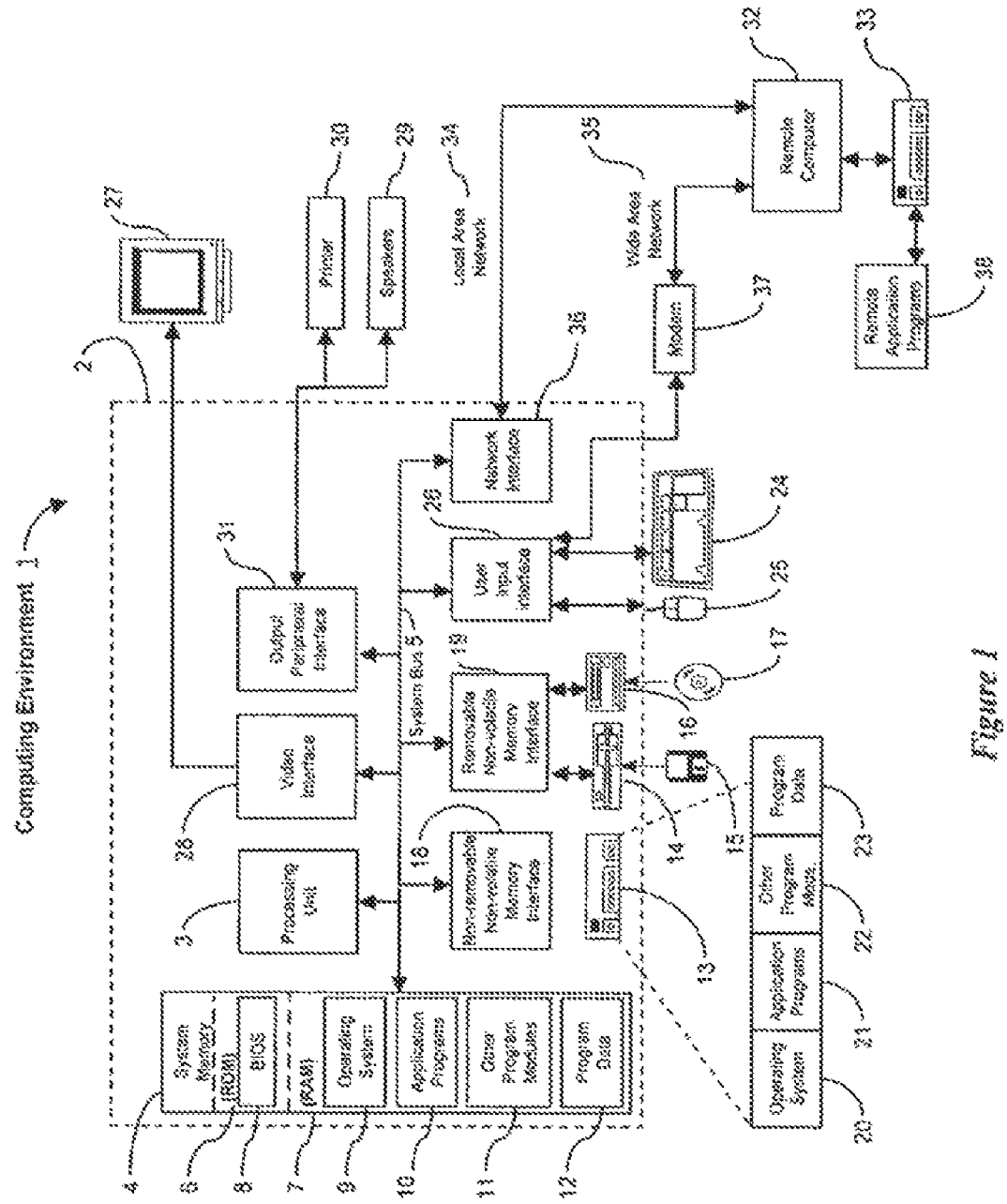
FIG. 1 is a block diagram illustrating an exemplary computing device suitable for implementing the processes in this disclosure.

Referring to FIG. 1, shown is a block diagram representing an exemplary computing device suitable for use in conjunction with implementing the processes described above. For example, the computer executable instructions that carry out the processes and methods for remotely authenticating credit card transactions may reside and/or be executed in such a computing environment as shown in FIG. 1. The computing system environment 1 is only one example of a suitable computing environment and is not intended to suggest any limitation as to the scope of use or functionality of the methods, systems and computer-readable media of this application. Neither should the computing environment 1 be interpreted as having any dependency or requirement relating to any one or combination of components illustrated in the exemplary computing environment 1.

Aspects of the methods, systems and computer-readable media of this application are operational with numerous other general purpose or special purpose computing system environments or configurations. Examples of well known computing systems, environments, and/or configurations that may be suitable for use with the methods, systems and computer-readable media of this application include, but are not limited to, personal computers, server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

Aspects of the methods, systems and computer-readable media of this application may be implemented in the general context of computer-executable instructions, such as program modules, being executed by a computer. Generally, program modules include routines, programs, objects, components, data structures, etc. that perform particular tasks or implement particular abstract data types. Aspects of the methods, systems and computer-readable media of this application may also be practiced in distributed computing environments where tasks are performed by remote processing devices that are linked through a communications network. In a distributed computing environment, program modules may be located in both local and remote computer storage media including memory storage devices.

An exemplary system for implementing aspects of the methods, systems and computer-readable media of this application includes a general purpose computing device in the form of a computer 2. Components of computer 2 may include, but are not limited to, a processing unit 3, a system memory 4, and a system bus 5 that couples various system components including the system memory 4 to the processing unit 3. The system bus 5 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, the Peripheral Component Interconnect (PCI) bus also known as Mezzanine bus, as well as its successor, the PCI-Express standard.

Computer 2 typically includes a variety of computer-readable media. Computer-readable media can be any available media that can be accessed by computer 2 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 2. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 4 includes computer storage media in the form of volatile and/or nonvolatile memory such as read only memory (ROM) 6 and random access memory (RAM) 7. A basic input/output system 8 (BIOS), containing the basic routines that help to transfer information between elements within computer 2, such as during start-up, is typically stored in ROM 6. RAM 7 typically contains data and/or program modules that are immediately accessible to and/or presently being operated on by processing unit 3. By way of example, and not limitation, FIG. 1 illustrates operating system 9, application programs 10, other program modules 11, and program data 12.

The computer 2 may also include other removable/non-removable, volatile/nonvolatile computer storage media. By way of example only, FIG. 1 illustrates a hard disk drive 13 that reads from or writes to non-removable, nonvolatile magnetic media, a magnetic disk drive 14 that reads from or writes to a removable, nonvolatile magnetic disk 15, and an optical disk drive 16 that reads from or writes to a removable, nonvolatile optical disk 17 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 13 is typically connected to the system bus 5 through an non-removable memory interface such as interface 18, and magnetic disk drive 14 and optical disk drive 16 are typically connected to the system bus 5 by a removable memory interface, such as interface 19.

The drives and their associated computer storage media discussed above and illustrated in FIG. 1, provide storage of computer-readable instructions, data structures, program modules and other data for the computer 2. In FIG. 1, for example, hard disk drive 13 is illustrated as storing operating system 20, application programs 21, other program modules 22, and program data 23. Note that these components can either be the same as or different from operating system 9, application programs 10, other program modules 11, and program data 12. Operating system 20, application programs 21, other program modules 22, and program data 23 are given different numbers here to illustrate that, at a minimum, they are different copies. A user may enter commands and information into the computer 2 through input devices such as a keyboard 24 and pointing device 25, commonly referred to as a mouse, trackball or touch pad. Other input devices (not shown) may include a microphone, joystick, game pad, satellite dish, scanner, or the like. These and other input devices are often connected to the processing unit 3 through a user input interface 26 that is coupled to the system bus, but may be connected by other interface and bus structures, such as a parallel port, game port or a universal serial bus (USB). A monitor 27 or other type of display device is also connected to the system bus 5 via an interface, such as an insecure or secure video interface 28. An exemplary secure video standard would be the High-Definition Multimedia Interface (HDMI) standard. In addition to the monitor, computers may also include other peripheral output devices such as speakers 29 and printer 30, which may be connected through an output peripheral interface 31.

The computer 2 may operate in a networked environment using logical connections to one or more remote computers, such as a remote computer 32. The remote computer 32 may be a personal computer, a server, a router, a network PC, a peer device or other common network node, and typically includes many or all of the elements described above relative to the computer 2, although only a memory storage device 33 has been illustrated in FIG. 1. The logical connections depicted in FIG. 1 include a local area network (LAN) 34 and a wide area network (WAN) 35, but may also include other networks. Such networking environments are commonplace in offices, enterprise-wide computer networks, intranets and the Internet.

When used in a LAN networking environment, the computer 2 is connected to the LAN 34 through a network interface or adapter 36. When used in a WAN networking environment, the computer 2 typically includes a modem 37 or other means for establishing communications over the WAN 35, such as the Internet. The modem 37, which may be internal or external, may be connected to the system bus 5 via the user input interface 26, or other appropriate mechanism. In a networked environment, program modules depicted relative to the computer 2, or portions thereof, may be stored in the remote memory storage device. By way of example, and not limitation, FIG. 1 illustrates remote application programs 38 as residing on memory device 33. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the methods, systems and computer-readable media of this application, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the methods, systems and computer-readable media of this application. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the methods, systems and computer-readable media of this application, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the methods, systems and computer-readable media of this application in the context of one or more stand-alone computer systems, the methods, systems and computer-readable media of this application is not so limited, but rather may be implemented in connection with any computing environment, such as a network or distributed computing environment. Still further, aspects of the methods, systems and computer-readable media of this application may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

In light of the diverse computing environments that may be built according to the general framework provided in FIG. 1, the systems and methods provided herein cannot be construed as limited in any way to a particular computing architecture. Instead, the methods, systems and computer-readable media of this application should not be limited to any single embodiment, but rather should be construed in breadth and scope in accordance with the appended claims.

Figure 2:
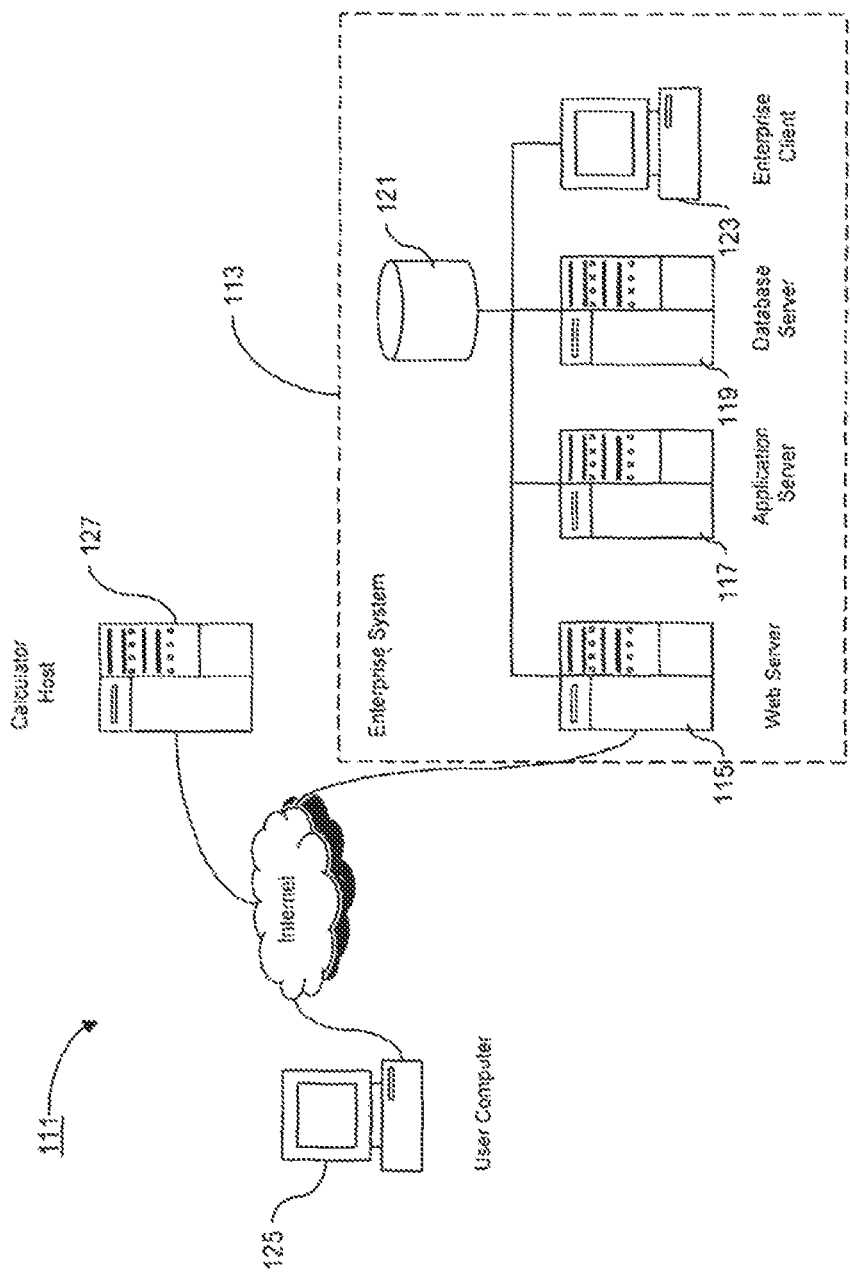
FIG. 2 illustrates the general environment in which the systems and methods of sharing data from web accessed calculators are implemented.

Illustrated in FIG. 2 is a typical environment in which the systems and methods for sharing data from web accessed calculators may be implemented. The general system 111 is a client/server system implemented through the Internet. An enterprise system 113 is provided which may include a web server 115, an application server 117, and a database server 119 with an associated data store 121. Also included in the enterprise system may be a plurality of enterprise client computers 123, such as computers operated by customer service representatives. It should be noted that the enterprise system 113 may comprise a plurality of web servers 115, application servers 117 and database servers 119, or all may be combined in a single computer device that provides the various functionalities of those servers. Access to the web server 115 is provided to a plurality of user computers 125 through the Internet. As explained in more detail herein, the web server 115 may provide web pages that include calculator applications, or may provide the user computer 125 with access to a separate calculator host 127, that provides a calculator application.

Figure 3:
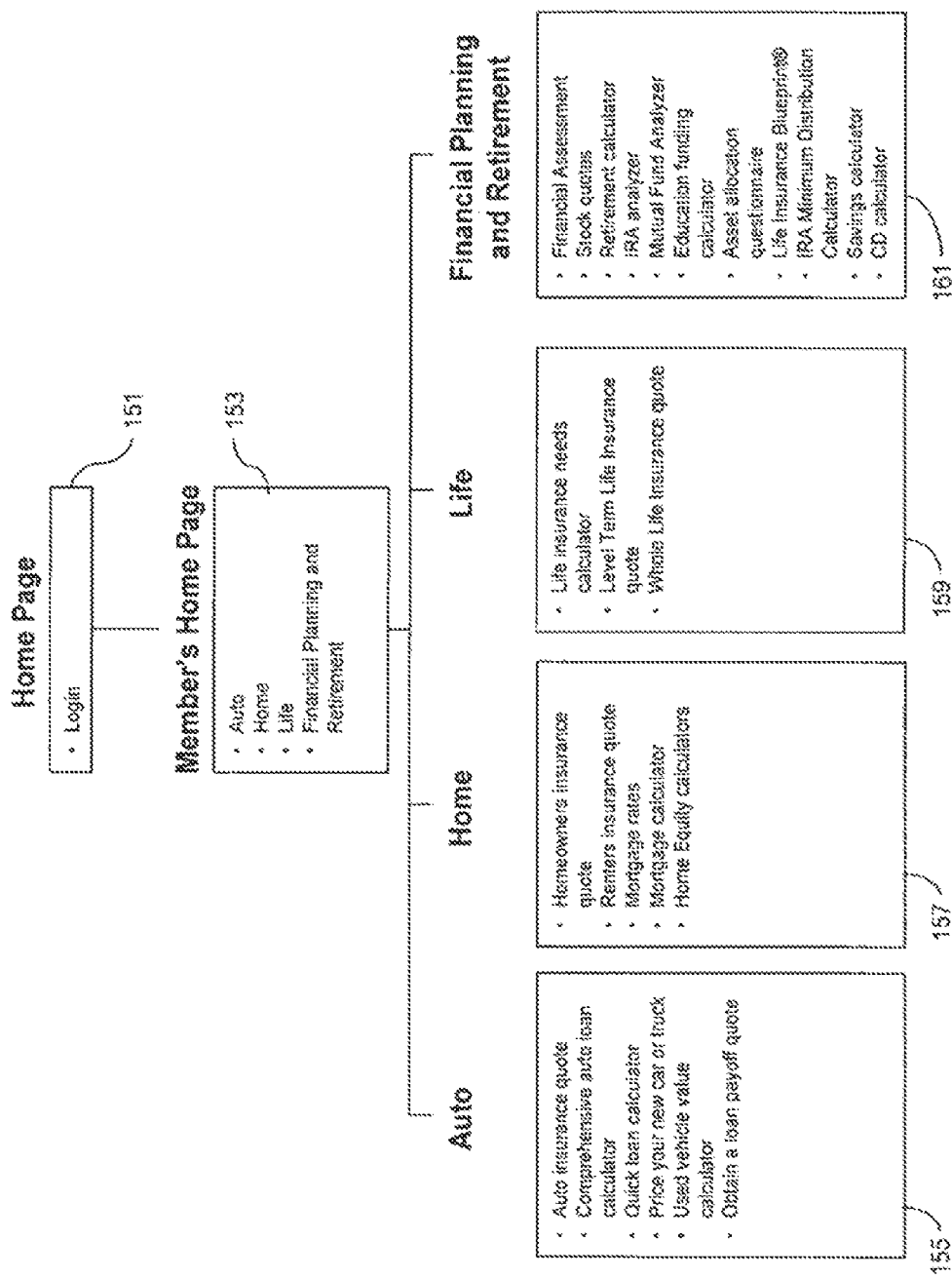
FIG. 3 illustrates a schematic of a web site layout including a plurality of calculators for different service offerings.

Illustrated in FIG. 3 is an example of the web site architecture that may provide access to a plurality of calculators. The typical arrangement includes a home page 151 that may provide a login functionality to the user, requiring a user name and password, and optionally a personal identification number to provide access to a member's home page 153. The member's home page 153 may provide information and hyperlinks to other pages offering services to the member. For example, in the illustration in FIG. 3, an example of a member's home page for a financial services web site is represented. The member's home page may include information about services relating to auto, home, life and financial planning and retirement. More information about each of those services would be included in a web page hyperlinked to the member's home page. For example auto related services may be provided in a web page 155 that may include information about the automobile related services provided and a plurality of calculators, indicated in FIG. 3 as "auto insurance quote," "comprehensive auto loan calculator," "quick loan calculator" "price your new car or truck," "used vehicle value calculator," and "obtain a loan payoff quote." Each of those references is a hyperlink to a tool or calculator embedded in a web page that can be accessed by the user by clicking on a hyperlink. Similarly calculators are illustrated for the home services web page 157, life services web page 159, and a financial planning and retirement web page 161. The calculators or tools referenced in FIG. 3 vary from the very simple to the complex. However all tools or calculators would require input from the user which would be processed and presented as an output to the user.

Figure 4:
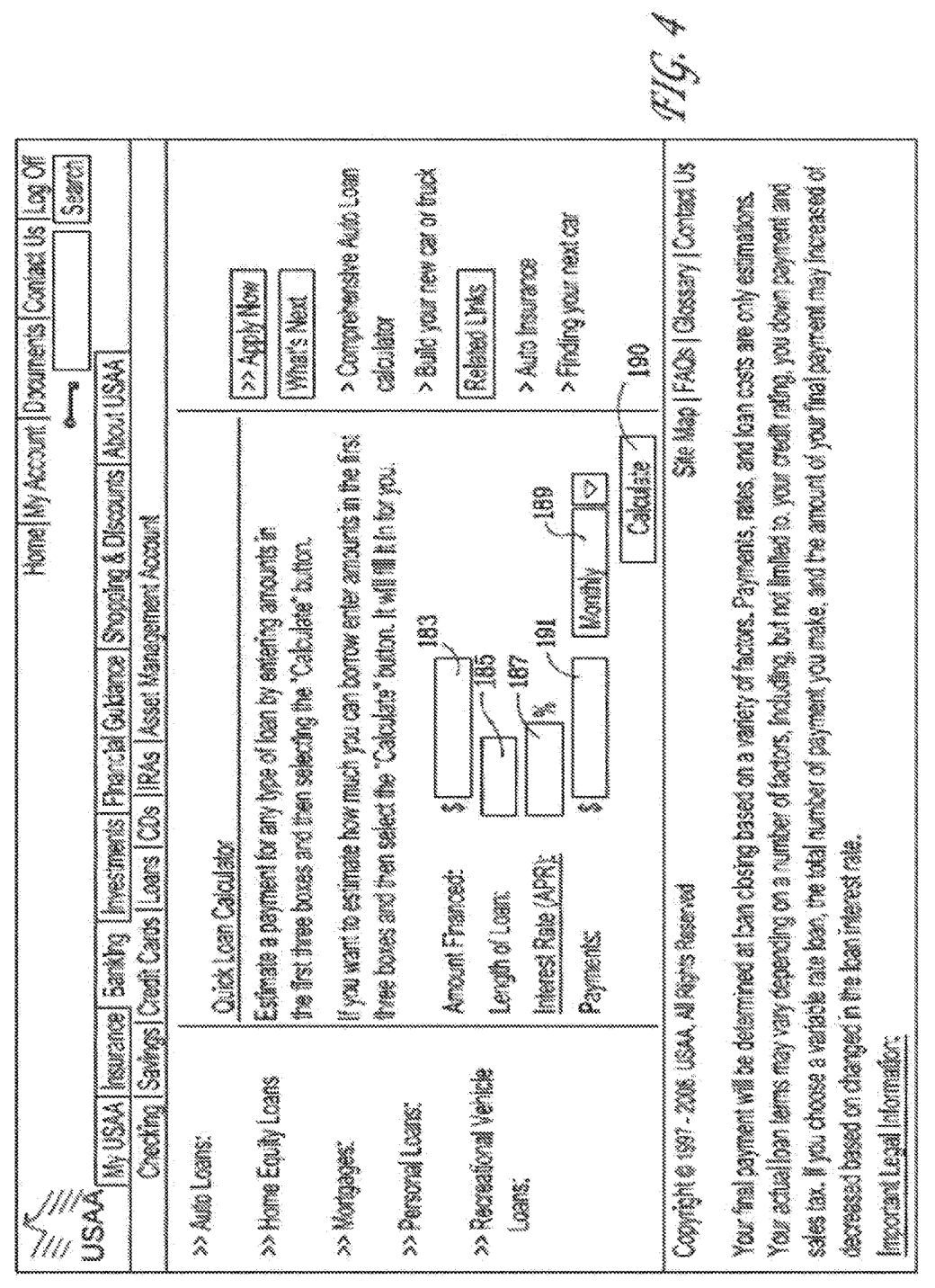

One simple calculator that may be provided by a financial services web site is illustrated in FIG. 4. The calculator would be presented as a web page in the user's web browser. In the example in FIG. 4 a quick loan calculator is displayed. The user may provide inputs for the amount financed 183, the length of loan 185 and the interest rate 187, and the calculator would calculates the monthly payment amount 191 for the user. Alternately the user may enter the monthly payment amount 191, the interest rate 187 and the length of loan 189 and use the calculator to calculate how much the user can afford to finance.

Figure 5:
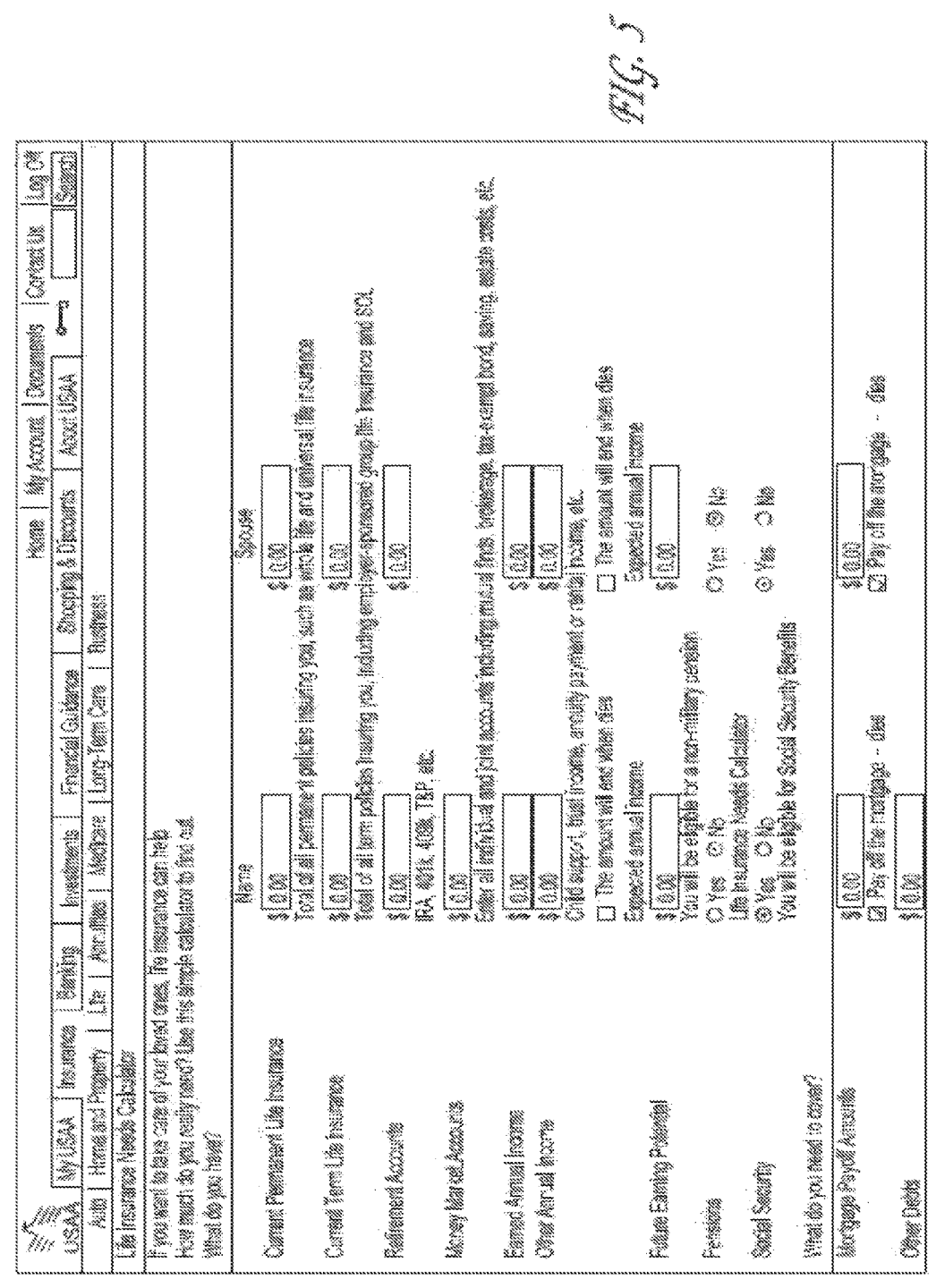

Illustrated in FIG. 5 is a more complex calculator (life insurance needs calculator) requiring additional inputs.

Figure 6:
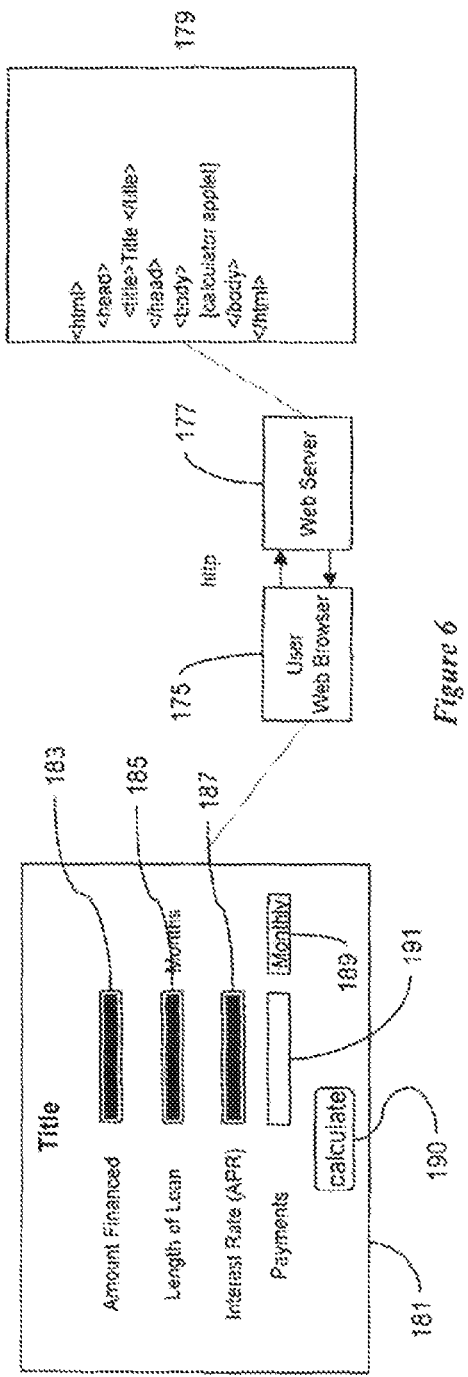
FIG. 6 is a schematic illustrating a web page layout of a calculator on a web server and the display of the calculator on a web browser.

FIG. 6 illustrates how a calculator would be displayed on a users web browser. Illustrated in FIG. 6 is a user web browser 175 that interacts with the web server 177 by means of http information exchanges through the Internet. The web server 177 would have access to a web page 179 that is typically an HTML document. Included within the HTML document is a calculator applet. An applet is software component that runs in the web browser using a language different from HTML. For example a Java applet would be written in Java byte code. The applets are used to provide the type of functionality that cannot be provided by HTML language, such as for example calculators.

The user's web browser 175 displays the web document as display 181 (see, e.g., FIG. 4). Illustrated in FIG. 6 is a rendering of the simple loan calculator shown in FIG. 4. Included in the display are input boxes for the Amount Financed 183, Length of Loan 185, Interest Rate (APR) 187, and the payment interval 189. The user types in data in the input boxes and clicks on the calculate button 190 and the output is presented in output box 191. Both the inputs to the calculator and the outputs calculated by the calculator comprise data values that are associated with data elements that may be captured by the enterprise system.

Figure 7:
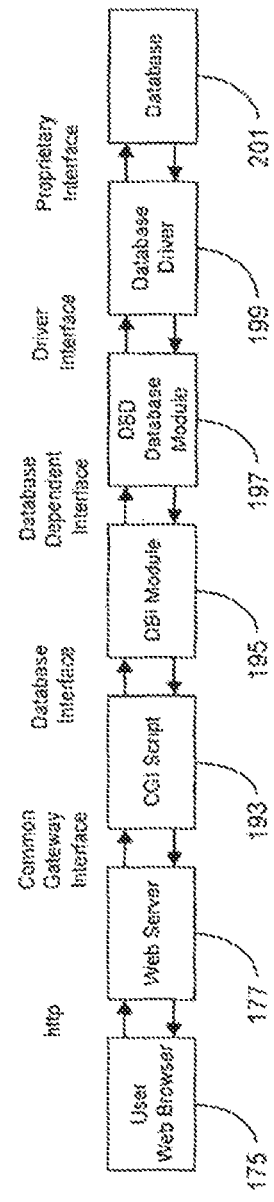
FIG. 7 is a flow diagram illustrating dataflow from a user's web browser to a database.

Illustrated in FIG. 7 is a flow chart showing how data values that are provided by the user or calculated by a calculator may be captured and stored in a database. Data values are transmitted by the user's web browser 175 to the web server 177, in response to instructions in the web document. The transmission of the data is performed using the Hypertext Transfer Protocol (HTTP). The web server then provides the data to an application that may include a Common Gateway Interface (CGI) Script 193. CGI is a standard protocol for interfacing external application software with a web server. The interface allows the server to pass requests from a client web browser 175 to the external application and from the external application to the web browser 175. Alternately, other technologies such as mod-perl or ASP that integrate script interpreters directly into web servers as modules may be used. Output from the CGI script 193 may be provided to a data base interface module (DBI) 195. The DBI module serves as an abstraction layer which allows programmers to use substantially platform-independent SQL code in their applications. Information from the DBI module may be processed by a database driver module 197 which in turn supplies a database driver and 199 to provide the data to the database 201. A DBD driver is available for most commercially available databases. DBD implementations may be downloaded from the Internet. DBD implementations exist for products such as Oracle, Microsoft SQL Server, IBM DB2, etc.

Figure 8:
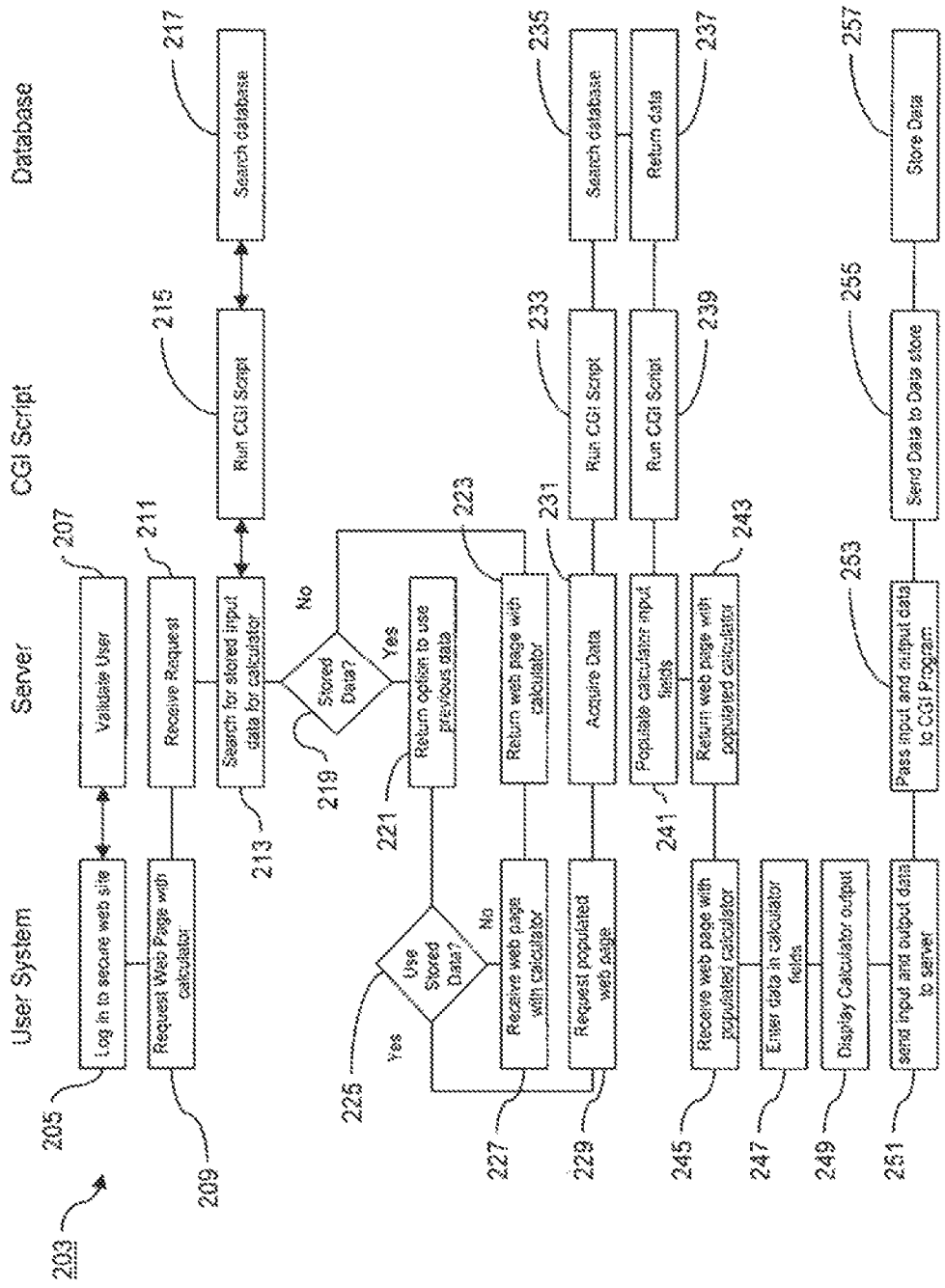
FIG. 8 is a flow chart illustrating the methodology for sharing and managing data created on a web page calculator.

FIG. 8 illustrates the methodologies 203 implemented by the users system (computer 125), the enterprise system web server 115, this CGI script and the database. Beginning with method element 205, the user would login to a secure web site by providing a user name and password, and optionally a personal identification number, which is then validated on the server-side with method element 207. The user may then request a web page with a calculator (method element 209). The server would receive the request (method element 211) and initiate a search for any stored data needed as input for the calculator (method element 213). As described above with reference to FIG. 7, a CGI is read may be engaged (method element 215) to provide instructions to a database such as searching the database (method element 117). Take for example the calculator shown in FIG. 5. The calculator is intended to determine the insurance needs of a customer. If the customer has insurance that is provided by the financial services company that operates the web site, then a search of the company database would determine that data relating to the current permanent life insurance and current term life insurance carried by the user is available input for the calculator. In that case, decision node 219 which determined that store data is available and provide the user is provided with an option to use the previous data (method element 221). If, on the other hand, no data is found, the system would return to the web page with the calculator with no data input fields filled (method element 223). Going back to the example where data exists in the database, the user is given a choice to use the existing data (decision node 225). If the user decides not to use the existing data, the user would receive the web page with the calculator and no data inputs (method element 227). If the user opts to make use of the existing data, then the user's system (e.g. the web browser) requests the web page with the calculator having the input fields populated with the existing data (method element 229). The server acquires data (method element 231) by, for example, using a CGI script (method element 233) and providing instructions to a database management system to search the database (method element 235) for the relevant data. The database management system would return the data (method element 237) which may be processed by a CGI script (method element 239) so as to populate the calculator input fields (method element 241). The server would then return the web page with the calculator input data fields populated with the existing data (method element 243). When the user receives the web page with the populated calculator (method element 245) the user may provide additional input, or change some of the inputs that were originally provided with the populated calculator (method element 247). The user may then process the data by engaging the calculator (i.e. clicking the calculate button), and the output would be displayed by the web browser (method element 249). Instructions included in the web page displaying the calculator out code sends the input and output data to the server (method element 251) which passes the data on to the CGI program (method element 253) which in turn passes the data to the database management system (method element 255) which then stores the data (method element 257). The stored data can then be searched if the user engages another calculator in another web page within the site. Data that is provided one calculator can then be accessed by another calculator in the web site. Additionally, all of the stored data is available for a customer service representative to access for marketing purposes.

The storage of calculator input and output data provides an enterprise with a rich collection of data about the interests of the users. This is data that would otherwise be very time-consuming to collect and is fertile grounds for data mining. Data mining is a process of analyzing data to identify patterns and relationships that may not have been previously discovered. These patterns and relationships may provide insights to predict customer behavior and to modify service offerings.

Figure 9:
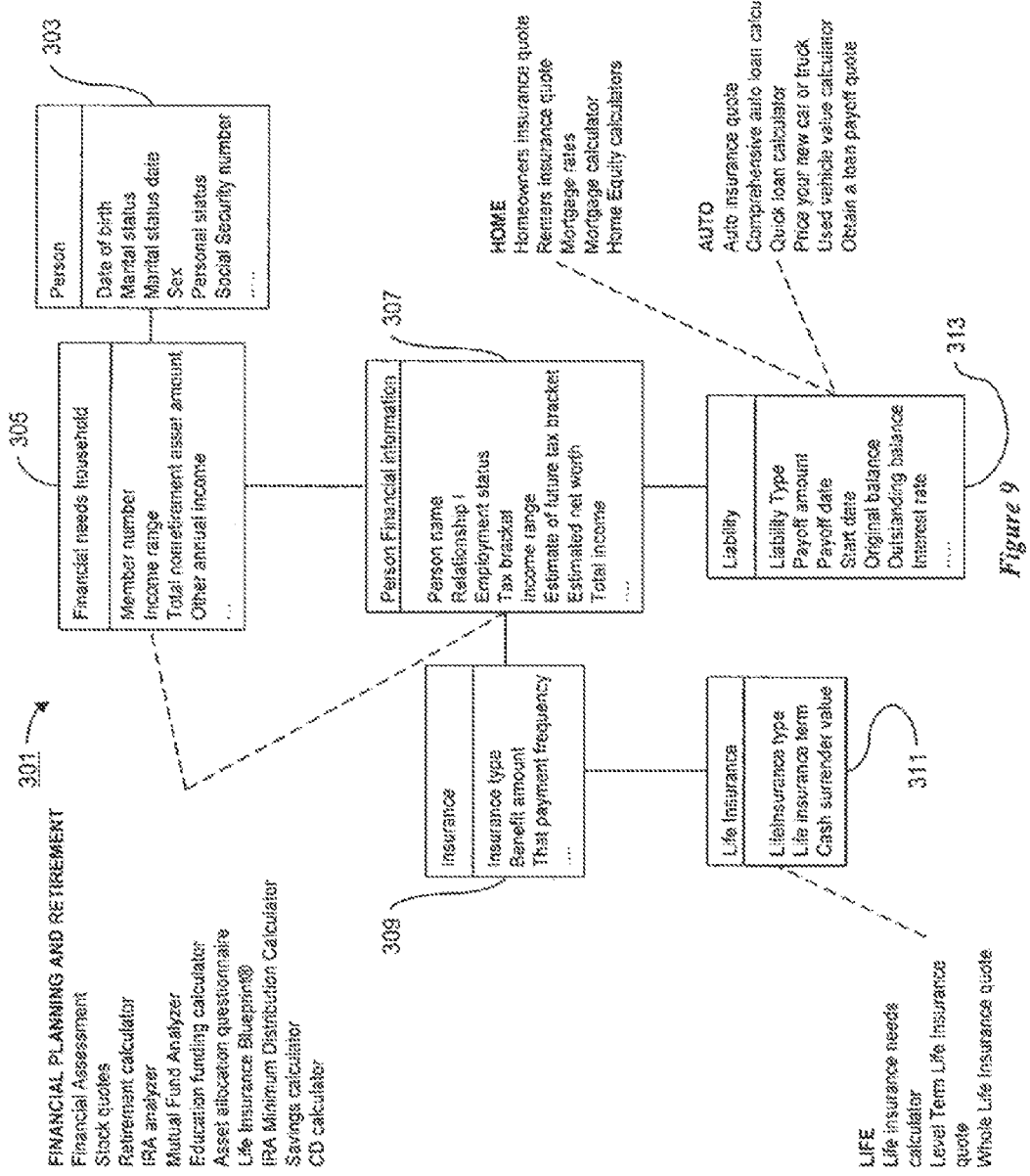
FIG. 9 is a schematic showing the commonality of data between financial calculators and a financial needs analysis template.

Illustrated in FIG. 9 is a partial data architecture for a financial need analysis template 301 that a financial services organization may use to advise customers about what steps they should take with regard to their financial condition. Included may be data relating to the person 303, relating to the financial needs of the household 305. Also included would be data about a person's financial information 307, data about insurance 309, data relating specifically to life insurance 311, and data relating to liabilities of a member 313. Typically this is data that a financial planner collects in a questionnaire that may be filled out when a member contacts a customer service representative. Mapped to the data types are the calculators illustrated in FIG. 3. As it is clearly apparent from FIG. 9 there is a significant overlap between data items that are inputs to the calculators references in the figure and the items necessary for a financial needs analysis template 301. By collecting data inputs and outputs from the calculators provided in a web site a significant amount of information and data necessary to provide a financial needs analysis may be collected and provided to a customer service representative. This results in a significant time savings in the collection of the data.

Although the more detailed examples provided above relate to financial services, it should be apparent to one of ordinary skill in the art that the systems and methods described herein will find application to other services that utilize calculators that have a common data items. Additionally, although references have been made to a limited number of data items that may be applied in a financial services organization, the systems and methods of the present disclosure may be applied in connection with a wide variety of data items relating to financial services.

The methods and systems of the present disclosure may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the systems and methods. When implemented on a general-purpose processor, the program code combines with the processor to provide a unique apparatus that operates to perform the indexing functionality of the present disclosure.

While the present disclosure has been described in connection with preferred embodiments, it is to be understood that other similar embodiments may be used or modifications and additions may be made to described embodiment for performing the same function of the systems and methods of the disclosure without deviating therefrom. Therefore, the present disclosure should not be limited to any single embodiment, but rather should be construed in breadth and scope in accordance with the appended claims.

What is claimed:

1. A shared data calculation processor-implemented method, comprising:
    providing a plurality of web-based financial calculators accessible from two or more web pages offering different types of financial service, wherein the plurality of web-based financial calculators comprise a first financial calculator associated with a first type of financial service and a second financial calculator associated with a second type of financial service;
    obtaining a user request for a selected web-based financial calculator from the plurality of web-based financial calculators;
    generating via a processor a query for stored data to be provided as input into the selected web-based financial calculator;
    providing the query to a relational database storing data shared by the plurality of web-based financial calculators;
    obtaining the stored data in response to providing the query;
    providing the stored data for the selected web-based financial calculator;
    obtaining a data output from the selected web-based financial calculator; and
    storing the data output in the relational database storing data shared by the plurality of web-based financial calculators.

2. The method of claim 1, further comprising:
    analyzing the data shared by the plurality of web-based financial calculators stored in the relational database; and
    identifying a user trend based on analyzing the data shared by the plurality of web-based financial calculators stored in the relational database.

3. The method of claim 2, further comprising:
    determining a user financial service need based on the identified user trend;
    generating an offer for a financial service based on the determined user financial service need; and
    providing the offer for the financial service for a user.

4. The method of claim 1, further comprising:
   providing an option for a user to modify the stored data to be provided as input into the selected web-based financial calculator; and
   obtaining a user modification to the stored data.

5. The method of claim 1, wherein the stored data obtained in response to providing the query includes data output from one of the plurality of web-based financial calculators other than the selected web-based financial calculator.

6. The method of claim 1, wherein the plurality of web-based financial calculators are selected from a list including: a financial planning calculator; a retirement calculator; an insurance calculator; a loan calculator; an automobile pricing calculator; and a home mortgage calculator.

7. The method of claim 1, wherein the plurality of web-based financial calculators is accessible via a web browser interface.

8. A shared data calculation system, comprising:
   a processor; and
   a memory disposed in communication with the processor, and storing processor-executable instructions to:
   provide a plurality of web-based financial calculators accessible from two or more web pages offering different types of financial service, wherein the plurality of web-based financial calculators comprise a first financial calculator associated with a first type of financial service and a second financial calculator associated with a second type of financial service;
   obtain a user request for a selected web-based financial calculator selected from the plurality of web-based financial calculators;
   generate a query for stored data for input into the selected web-based financial calculator;
   provide the query to a relational database storing data shared by the plurality of web-based financial calculators;
   obtain the stored data after providing the query;
   provide the stored data to the selected web-based financial calculator;
   obtain a data output from the selected web-based financial calculator; and
   store the data output in the relational database storing data shared by the plurality of web-based financial calculators.

9. The system of claim 8, the memory further storing instructions to:
   analyze the data shared by the plurality of web-based financial calculators stored in the relational database; and
   identify a user trend based on analyzing the data shared by the plurality of web-based financial calculators stored in the relational database.

10. The system of claim 9, the memory further storing instructions to:
    determine a user financial service need based on the identified user trend;
    generate an offer for a financial service based on the determined user financial service need; and
    provide the offer for the financial service for a user.

11. The system of claim 8, the memory further storing instructions to:
    provide an option for a user to modify the stored data to be provided as input into the selected web-based financial calculator; and
    obtain a user modification to the stored data.

12. The system of claim 8, wherein the stored data obtained in response to providing the query includes data output from one of the plurality of web-based financial calculators other than the selected web-based financial calculator.

13. The system of claim 8, wherein the plurality of web-based financial calculators are selected from a list including: a financial planning calculator; a retirement calculator; an insurance calculator; a loan calculator; an automobile pricing calculator; and a home mortgage calculator.

14. The system of claim 8, wherein the plurality of web-based financial calculators is accessible via a web browser interface.

15. A processor-readable tangible medium storing processor-executable shared data calculation instructions to:
    provide a plurality of web-based financial calculators accessible from two or more web pages offering different types of financial service, wherein the plurality of web-based financial calculators comprise a first financial calculator associated with a first type of financial service and a second financial calculator associated with a second type of financial service;
    obtain a user request for a selected web-based financial calculator selected from the plurality of web-based financial calculators;
    generate a query for stored data for input into the selected web-based financial calculator;
    provide the query to a relational database storing data shared by the plurality of web-based financial calculators;
    obtain the stored data in response to providing the query;
    provide the stored data for the selected web-based financial calculator;
    obtain a data output from the selected web-based financial calculator; and
    store the data output in the relational database storing data shared by the plurality of web-based financial calculators.

16. The medium of claim 15, further storing instructions to:
    analyze the data shared by the plurality of web-based financial calculators stored in the relational database; and
    identify a user trend based on analyzing the data shared by the plurality of web-based financial calculators stored in the relational database.

17. The medium of claim 16, further storing instructions to:
    determine a user financial service need based on the identified user trend;
    generate an offer for a financial service based on the determined user financial service need; and
    provide the offer for the financial service for a user.

18. The medium of claim 15, further storing instructions to:
    provide an option for a user to modify the stored data to be provided as input into the selected web-based financial calculator; and
    obtain a user modification to the stored data.

19. The medium of claim 15, wherein the stored data obtained in response to providing the query includes data output from one of the plurality of web-based financial calculators other than the selected web-based financial calculator.

20. The medium of claim 15, wherein the plurality of web-based financial calculators are selected from a list including: a financial planning calculator; a retirement calculator; an insurance calculator; a loan calculator; an automobile pricing calculator; and a home mortgage calculator.

21. The medium of claim 15, wherein the plurality of web-based financial calculators is accessible via a web browser interface.

* * * * *